Aug. 22, 1967  N. MARFORIO  3,336,887
TWO-THREAD CHAIN STITCH SEWING MACHINE
Filed Sept. 15, 1964  11 Sheets-Sheet 11
Fig_17
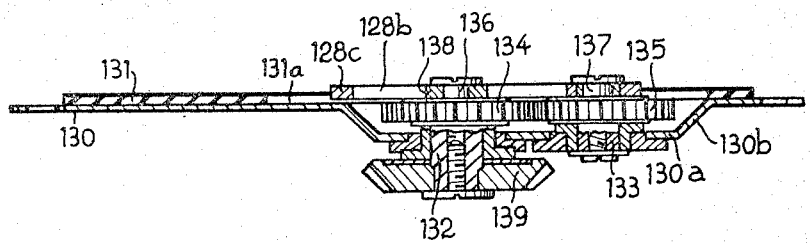
Fig_18
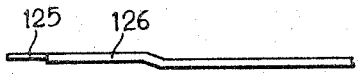

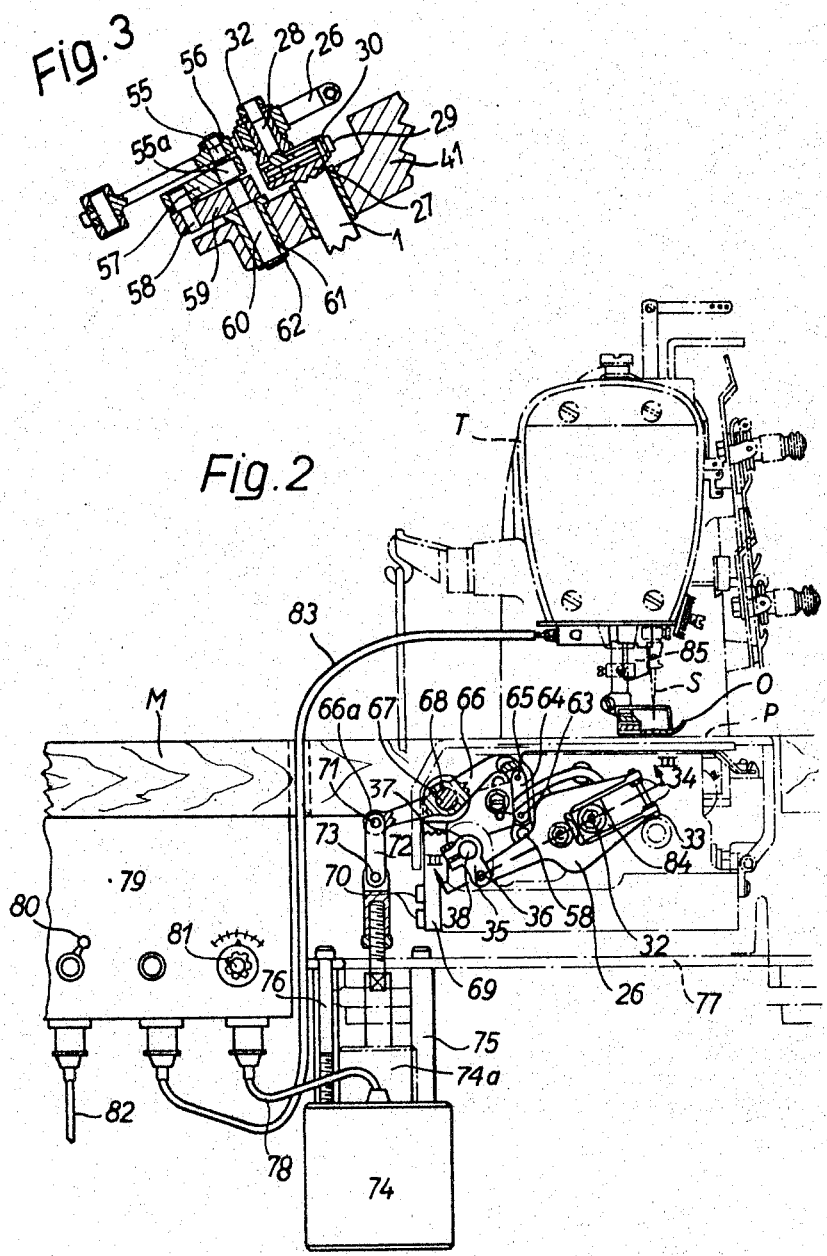

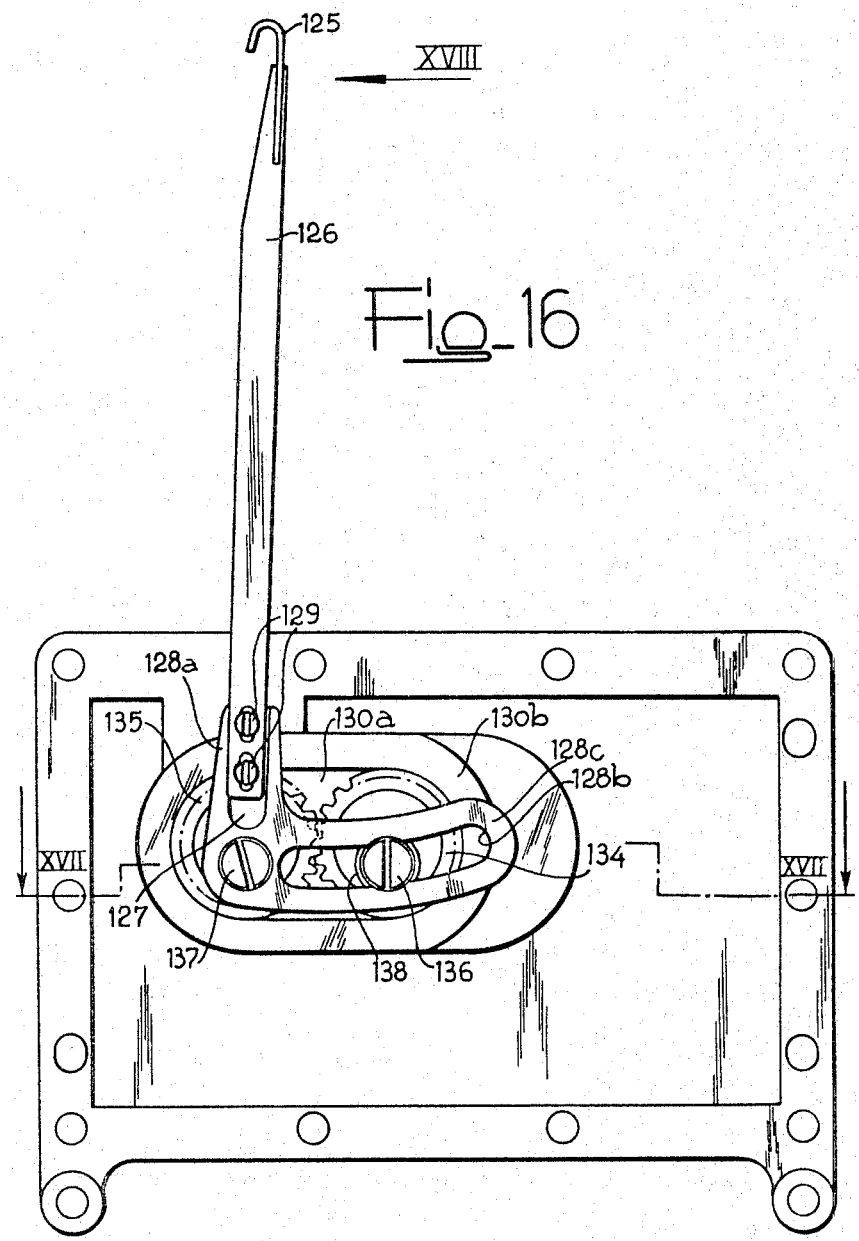

United States Patent Office 3,336,887
Patented Aug. 22, 1967

3,336,887
TWO-THREAD CHAIN STITCH SEWING MACHINE
Nerino Marforio, Milan, Italy, assignor to S.p.A., Virginio Rimoldi & Co., Milan, Italy
Filed Sept. 15, 1964, Ser. No. 396,573
Claims priority, application Italy, Sept. 20, 1963, 19,576/63
6 Claims. (Cl. 112—197)

ABSTRACT OF THE DISCLOSURE

A double chain-stitch sewing machine provided with a switch control device adjacent the path normally followed by one hand of the machine operator. Actuating means interconnect the control device and means for reversing the feed of the work, whereby activation of the control device by the operator causes the feed direction of the work to reverse.

---

This invention relates to improvements in two-thread chain stitch sewing machines.

It is known that in addition to rotary machines forming two-thread lock stitches single needle machines, performing two-thread chain stitches are increasingly employed by manufacturers of ready to wear clothes even for such garments as shirts and under wear.

The reason for the increasingly wider use of two-thread chain stitch machines is, in addition to the well known advantageous features of the double chain stitch, the long operating range of the machine, extending to one or even several days, without requiring change of spools which may contain ten thousand yards of both needle and looper thread.

On the other hand, the duration of operation of rotary machines performing a two-thread lock stitch is very short, inasmuch, as the small spool within the rotary looper must be changed frequently since only a limited length of thread can be wound thereon.

The reason why two-thread chain stitch machines have not entirely superseded the rotary machines effecting a two-thread lock stitch in the manufacture of ready-made cloths resides in the difficulty in "closing" the stitch upon completion of a row of stitches in sewing together the materials. The aforementioned stitch is liable to unravel and the row of stitches will become undone upon manipulation or washing of the cloths, unless the stitches are covered by some other finishing element.

This drawback does not occur, or is negligible, with the use of rotary machines for two-thread lock stitches which are not readily unravelled or become unravelled only over two or three stitches at the utmost. The latter machines further afford the possibility of finishing the row of stitches by briefly reversing the direction of feed of the work, then re-establishing the normal direction of feed so as to effect, at the edge of the work a superimposition of a plurality of rows of stitches and thus increase the stitch density so as to prevent unravelling even in part of the row of stitches.

A similar result was sought in machines performing a two-thread chain stitch, and means were first of all developed for forming stitches on reverse feed of the sewn work, as is essential in order to superpose a plurality of rows of stitches.

The means for forming stitches on such machines on reverse feed of the work comprises a hook cooperating with the needle and looper, which is operated to widen and open a triangle shape of thread configuration formed by the needle and looper threads on reversal of feed, in order to insure the formation of chain stitches under these circumstances also.

With such sewing machines forming two-thread chain stitches, in order to secure the stitch, sewing should be stopped as near as possible at the edge of the work, the presser foot should be lifted, a suitable operating lever should be actuated to reverse the feed, the work should be sewn as it is fed in a reverse direction over the desired length and, finally, forward feed should be re-established and a further row of stitches should be sewn on the two previously formed rows.

In addition to requiring a particular skill of the operator of such a machine this method makes it practically impossible to obtain in a mass production of cloths the finishing or securing rows of stitches which are uniform throughout.

This invention obviates the above drawbacks and provides for closing the rows of stitches effected by a two-thread chain stitch sewing machine in a simple manner, with a minimum of intervention on the part of the operator. It provides also a uniform length of the superposed sections of rows of stitches throughout, with the possibility of making such sections of any predetermined, desired length.

With the above objects in view a sewing machine for two-thread chain stitches is provided according to this invention with means for automatically forming sections of rows of stitches by sequentially sewing three sections of rows of predetermined length superposed on one another in response to actuation by the operator of a suitable control while sewing is in progress.

According to a preferred embodiment of this invention the said means comprise:

A mechanism interposed in the drive of the feed dogs the advancing material being sewed adapted to vary the pitch and direction of feed in accordance with the inter-relative position of the components of said mechanism;

A control device provided with an electromagnet, which on being energized moves certain components of the mechanism interposed in the drive of the dogs toward a position for reversal of the feed, and a switch which upon closing energizes the electromagnet;

A hook swinging in a plane parallel to the plane in which the row of stitches are formed, adapted to expand the threads as the two-thread chain stitch is being formed during reverse feed of the work.

According to a further embodiment of this invention said switch is of the normally open, push button type and is arranged on the machine in proximity of the stitch forming region.

The switch is preferably connected in the circuit of a relay which on being energized closes the normally open circuit of the electromagnet.

Means is further provided for varying the time duration of energizing the electromagnet independently of the duration of closure of the switch.

According to a further feature of this invention the winding of said relay is automatically connected, after it has been energized through closure of said switch, to a variable capacitance which in turn is connected upon de-energizing of the winding to the same source of rectified alternating current from which the winding received energy upon closure of the switch.

Further features and advantages of this invention will be understood from the following description of an embodiment given, by way of example, with reference to the accompanying drawings, wherein:

FIGURE 1 is a part sectional diagrammatical elevational view of a sewing machine according to this invention, FIGURE 2 is a part sectional front view, FIGURE 3 is a sectional view on line III—III of FIGURE 2, FIGURE 4 is a diagrammatical plan view, FIGURE 5 is a sectional view on line V—V of FIGURE 1, FIGURE 6 is a sectional view on line VI—VI of FIGURE 5, FIGURE 7 is a view in the direction of the arrow VII in FIGURE 6, FIGURE 8 is a sectional view on line VIII—VIII of FIGURE 5, FIGURE 9 is a sectional view on line IX—IX of FIGURE 8, FIGURE 10 is a diagram of the electric circuit for the control of the machine for reverse feed of the work, FIGURE 11 is a diagrammatical view of a two-thread chain stitch, FIGURE 12 is a diagrammatical, perspective view of two sheets of material sewn together by the machine according to this invention, FIGURES 13 and 14 are explanatory diagrams of the operation of the work feed reversing mechanism provided in the machine according to this invention, FIGURE 15 is a longitudinal sectional view, on an enlarged scale, of a part of the bedplate of a modification of the machine, FIGURE 16 is a plan view of the hook and the operating mechanisms in the modified machine.

FIGURE 17 is a sectional view on line XVII—XVII of FIGURE 16, and

FIGURE 18 is a side view looking in the direction of the arrow XVIII of FIGURE 16 showing the hook and the terminal portion of its supporting rod.

Figure 1:
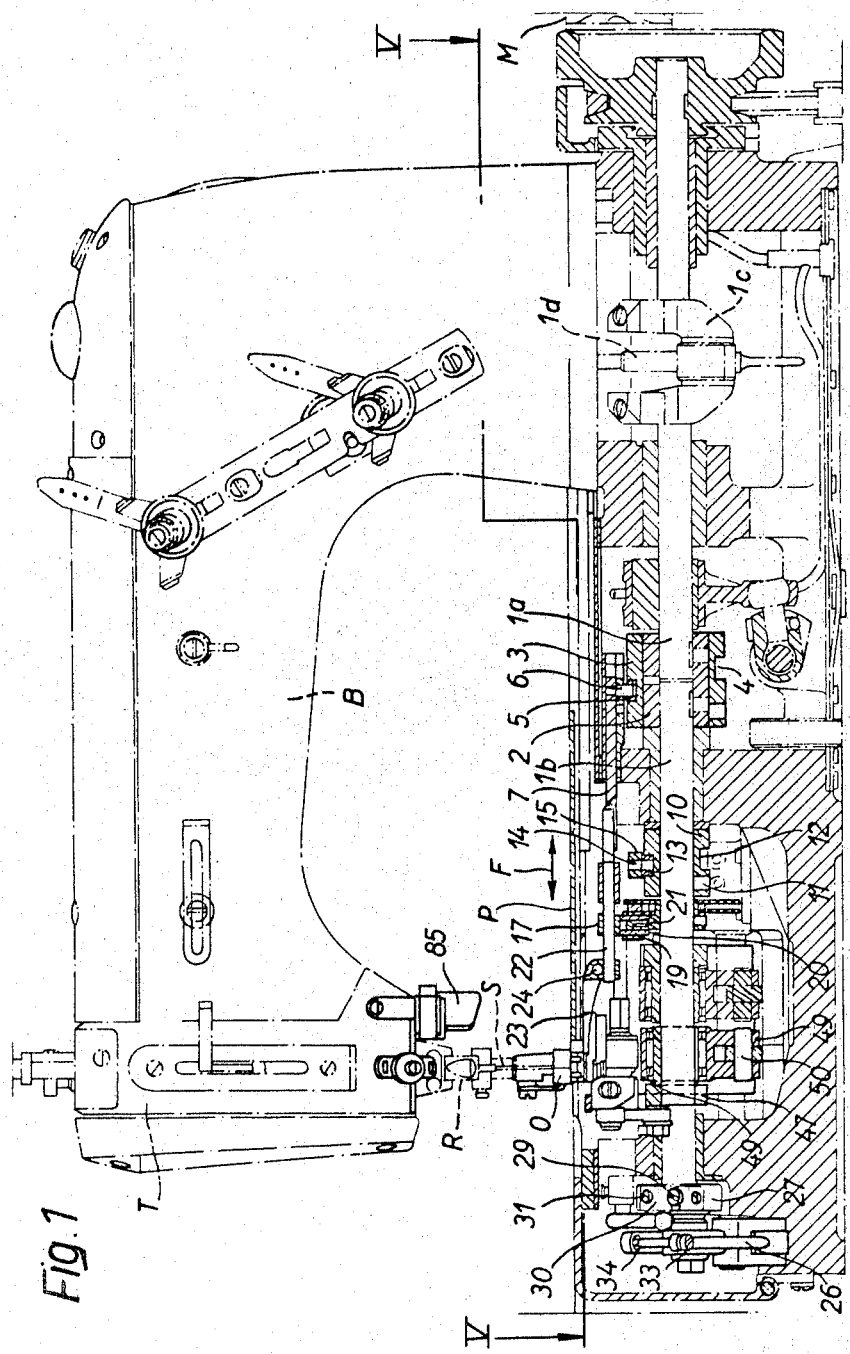
Figure 4:
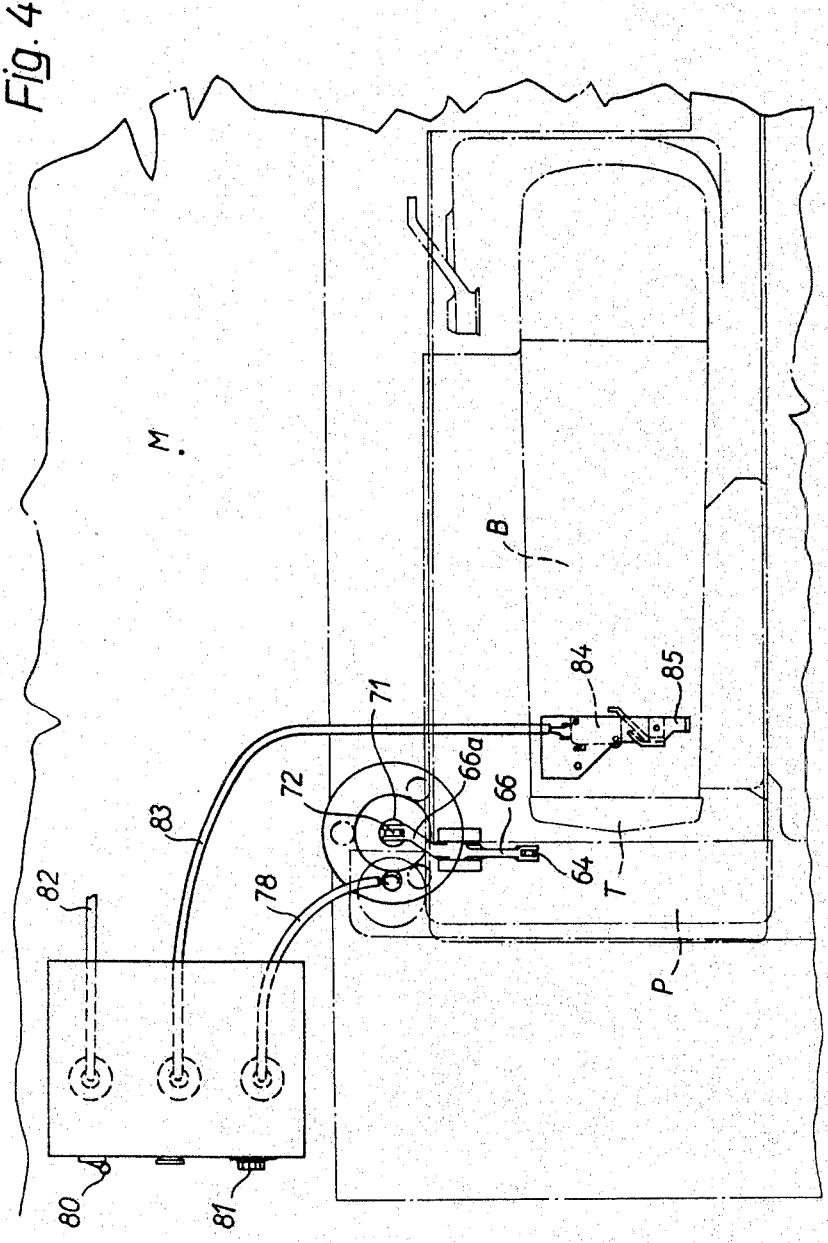

The machine shown on the drawing comprises a bedplate and an arm B overlying the surface P over which the work travels.

A bar R for the needle S and a presser foot O are mounted in the forward portion T of the arm B. The machine is mounted in a recess in the table M, the top face of which is arranged at the level of the surface P.

A main drive shaft is journaled in the machine frame and comprises two shaft sections 1a, 1b. The former transmits motion through a crank 1c and a connecting rod 1d to a swinging lever (not shown) housed in the machine arm B which drives the needle bar R. The other shaft section 1b drives the mechanism which transmits motion to the feed dogs, the looper cooperating with the needle S and other components to be described hereafter.

The two shafts 1a, 1b are interconnected by a coupling 2 over which and keyed thereto is a sleeve 3. The latter is formed with a helical cam groove 4 receiving a roller 5 attached to a pin 6 forced into an opening in the slide 7, FIGURE 5, held in register within a rectangular frame 8 fastened down by means of screws 9.

On rotation of the sleeve 3 the above described mechanism causes the slide 7 to reciprocate in a horizontal plane in the direction of the arrow F in FIGURE 1, that is, lengthwise of the machine.

The shaft section 1b has mounted thereon another sleeve 10 secured thereto by means of set screws 11. The sleeve 10 is formed with a helical circumferential groove 12 receiving a roller 13 pivoted on a pin 14 secured to the end of an arm 15 of a swinging lever fulcrumed around a pin 16.

Figure 5:
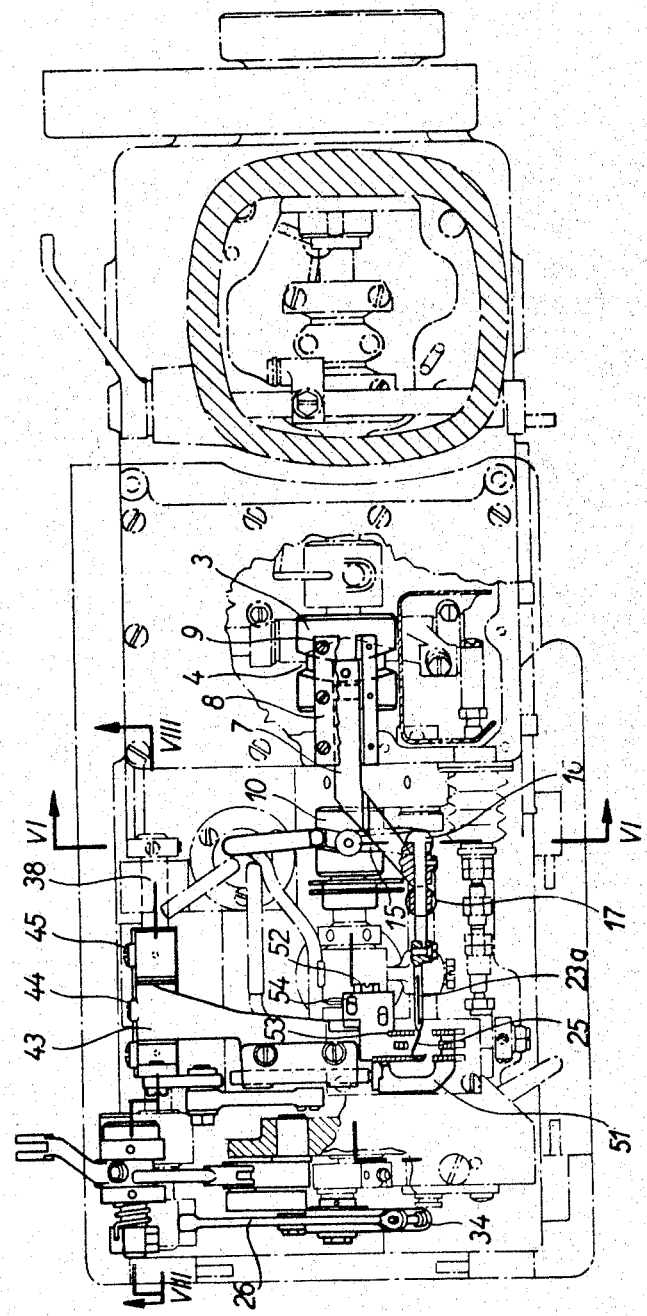
Figure 6:
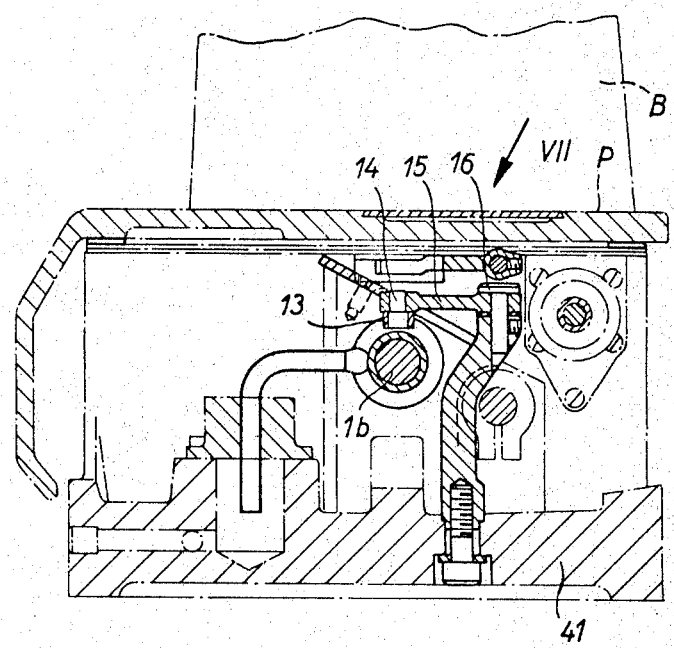
Figure 7:
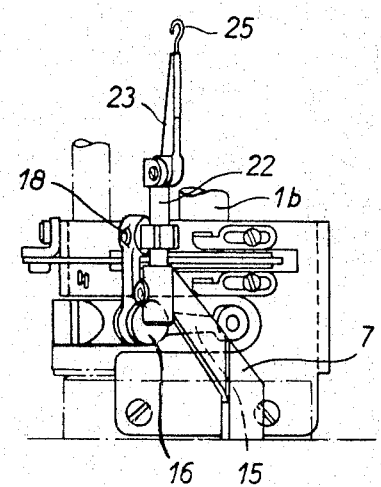

The other arm of the swinging lever carries a bushing 17, FIGURE 5, having a projecting pin mounted for oscillation within a bushing 19 positioned in the stationary structure by a screw 18, FIGURE 7, axial play of said pin with respect to the bushing 19 being prevented by the provision of a washer 20 and lock screw 21, FIGURE 1.

The oscillating bushing 17 has mounted therein for axial displacement a shaft 22 coupled at one end to slide 7 and carrying at the other end a support 23 secured thereto by means of a strap fastened by a screw 24. A groove 23a in the support 23 receives a hook 25 cooperating in a manner known per se in forming two-thread chain stitches on reverse feed of the work.

A lever 26, FIGURES 1, 2 and 3, is arranged at the end of the shaft section 1b, opposite to the end carrying the sleeve 2 connecting it with the shaft section 1a. The lever 26 is mounted for movement on a crank disc 27 attached to shaft section 1b. A radial groove in the crank disc 27 slidably receives the head of a pin 28. The position of the pin head is controlled by a screw 29 the head of which bears against a plate 30 secured to the disc 27 by means of screws 31, FIGURE 1. By turning the screw 29, such as by means of a screw driver, after loosening of the nut 32, FIGURE 3, eccentricity of the pin 28 can be either increased or reduced. This adjustment will set the machine for sewing any desired stitch length, and should of course be carried out when the machine is idle.

Figure 8:
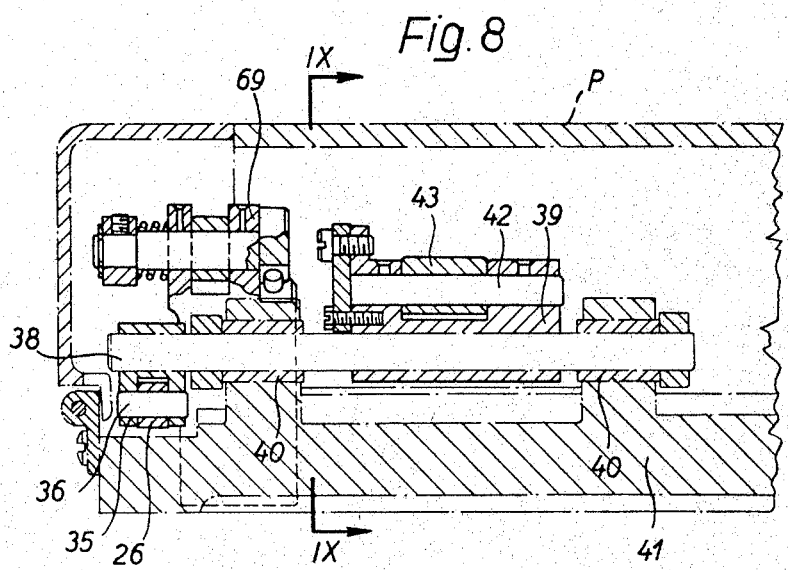
Figure 9:
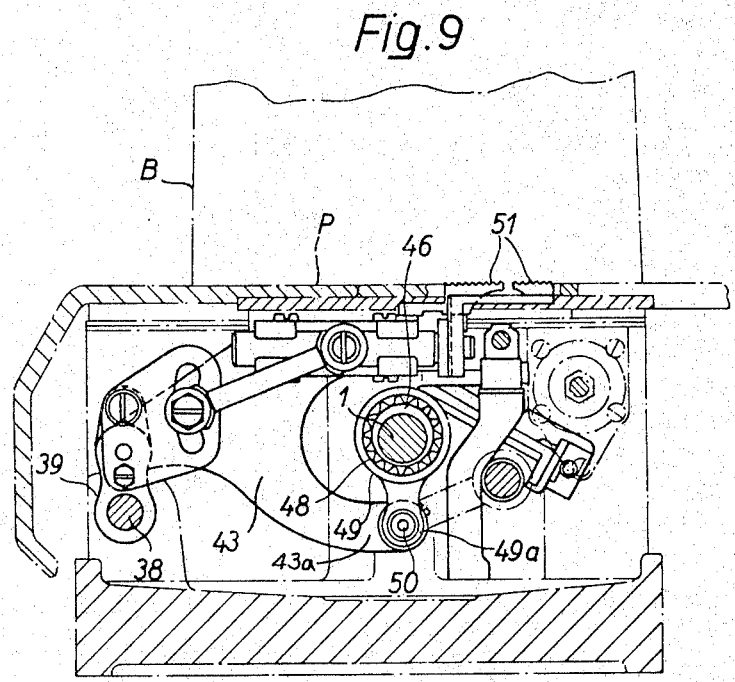

The pin 28 fits through a bushing visible in FIGURE 3 into a hole in a quadrangular block slidable in a guide formed in a fork-shaped end of the lever 26, which can be arrested at a predetermined position in this guide by means of nuts 33, 34, FIGURE 2. The other end of the lever 26 is fulcrumed in a fork 35 by means of a stud 36. The fork 35 is in turn secured by a strap fastened by a screw 37 to an oscillating shaft 38. The latter carries a fork-shaped support 39, FIGURES 8 and 9, and is mounted for oscillation within two bushings 40 driven into holes in the bedplate 41, FIGURE 8. A pin 42 is secured to the oscillating support 39 and has pivoted thereto one end of the feed dog holder 43 which is secured thereto by means of a screw 44, FIGURE 5. The support 39 is securedly fastened to the pin 42 by screws 45. The support 39 thereby imparts to the feed dog holder 43 a reciprocation in a horizontal plane under the action of the movement of the shaft 38, the extent of said movement depending upon the eccentricity of the pin 28 adjusted with respect to the axis of the main shaft section 1b.

An eccentric 46 is arranged in proximity to the dog holder 43 and is secured by means of two screws to the main shaft section 1b. The eccentric turns within a roller cage 48 housed by the dog lifting ring 49. The latter carries at its bottom portion a fork 49a which is fulcrumed in a dowel 50 carried by an arcuated lower projection 43a of the dog holder 43.

On rotation of the shaft sections 1a, 1b forming the main drive shaft the eccentric 46 swings in a vertical plane the ring 49 which affects the reciprocation of the dog holder 43 in a horizontal plane and causes its portion supporting the dogs 51 to move over an elliptical path.

The dogs 51 are secured to the dog holder 43 by means of a screw 52 having a hexagonal head and through a bell crank 53 formed with two eyelets through which bolts 54 extend to form with the eyelets a connection for positioning the dog 51, FIGURE 5.

A stud 55, FIGURE 3, is provided intermediate the lever 26 and is secured by a nut 56. The end 55a of the stud extending from the lever 26 towards the forward wall of the bedplate 41 has fulcrumed thereto a connecting rod 57. The other end of the connecting rod 57 is fulcrumed in a pin 58 secured to the end of a swing arm 59 fulcrumed in turn in a pivot 60 forced into a bushing 61 fitted into an opening in the bedplate 41 and held by a split ring 62. The arm 59 is formed with a fork-shaped projection having fulcrumed thereto through a pin 63 a connecting rod 64. The latter is articulated in a pin 65 carried by the fork-shaped end of the arm 66 of a beam lever carried on the shaft 67 and secured to the latter by means of a bolt 68. The shaft 67 is mounted for rotation in a support 69 secured to the bedplate by means of screws 70.

The other arm 66a of the beam lever carries a pivot pin 71 having fulcrumed thereto a link 72 hinged through a pin 73 to the fork-shaped end of the plunger 74a of an electromagnet 74. The electromagnet 74 is secured by means of a pair of spacer tube 75 and two screws 76 to a plate 77 supporting the machine.

Figure 10:
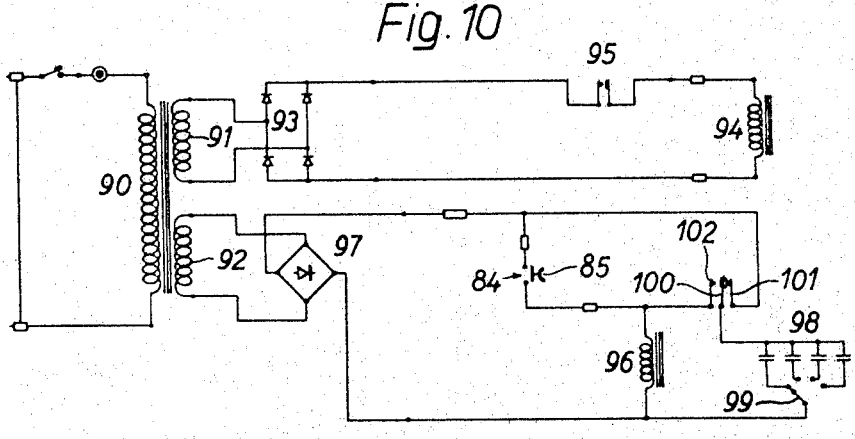
Figure 11:
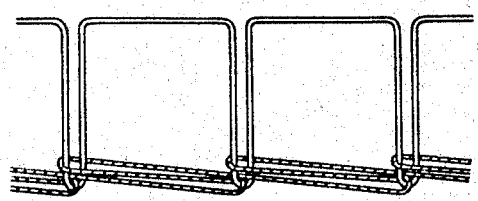
Figure 12:
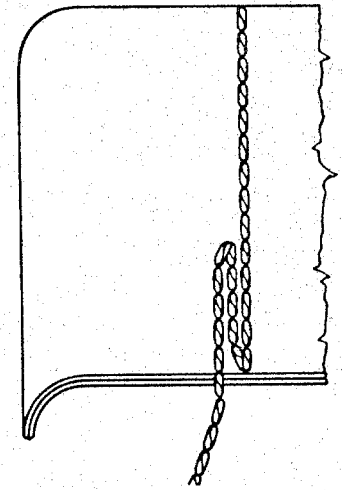

Current is supplied to the electromagnet 74 through a cable 78 issuing from a compartment 79 enclosing all the devices for feeding and controlling the electromagnet, such as a main switch 80, a knob 81 for adjusting the period of reverse feed and a fitting for the cable 83 leading to a switch 84 operated by a push button 85 arranged beneath the head T of the arm of the machine casing. The circuit of the electromagnet 74 and controls therefor, shown in FIGURE 10, comprises a transformer 90 having two secondary windings 91, 92. The former secondary winding 91 feeds through a rectifier 93 a winding 94 of the electromagnet 74 through a pair of normally open contacts 95 which close on energization of a winding 96 fed through a switch 84 and a rectifier 97 which is fed from the other winding of the transformer 90. Capacitors 98 are connected in parallel with the winding 96 and switch 84 and are each connectable with the rectifier 97 of an arm 99 operated by the knob 81, connected to the other end of the rectifier 97 by a contact 100 normally adjacent the stationary contact 101. The movable contact 100 is attracted towards the stationary contact 102 connected to the winding 96 when the latter is energized, that is, on closure of the contacts 95.

Since the capacitors 98 differ in capacitance, on displacement of the movable contact 99 it is obviously possible to adjust the energization period of the winding 96, and consequently the period of operation of the electromagnet 74 independently of the period of closure of the contact 84.

The machine according to this invention operates as follows:

As sewing with the work fed in a normal direction nears completion and the stitch row is secured near the edge of the fabric beneath the presser foot and fed by the dogs, the operator places his thumb which moves forward with the work against the push button 85 operating the switch 84.

Closure of the switch provides reversal in feed. The period of feed in a reverse direction is determined by the above described timing arrangement which is set by operating the knob 81 situated on the right side of the forward wall of the compartment 79.

Energizing of the electromagnet 74 pushes its plunger 74a vertically upwards thereby swinging the lever 66 about its fulcrum 67. On movement of the lever 66 the link 64 is pushed downwardly and moves the arm 59 fulcrumed at the pivot 60 in the same direction.

Figure 13:
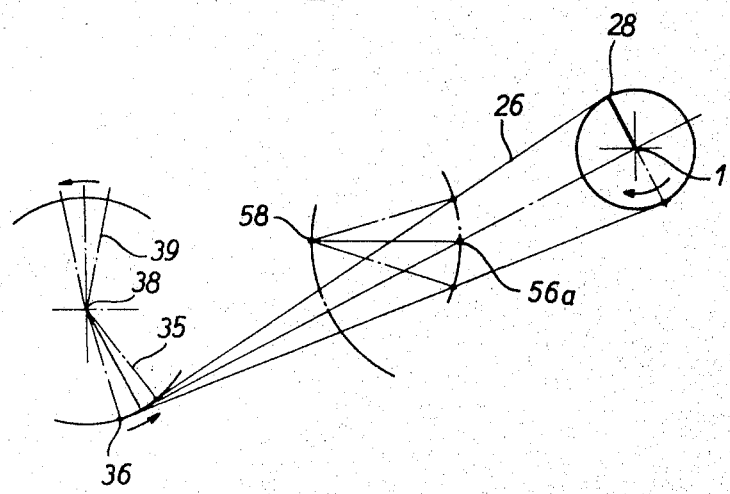
Figure 14:
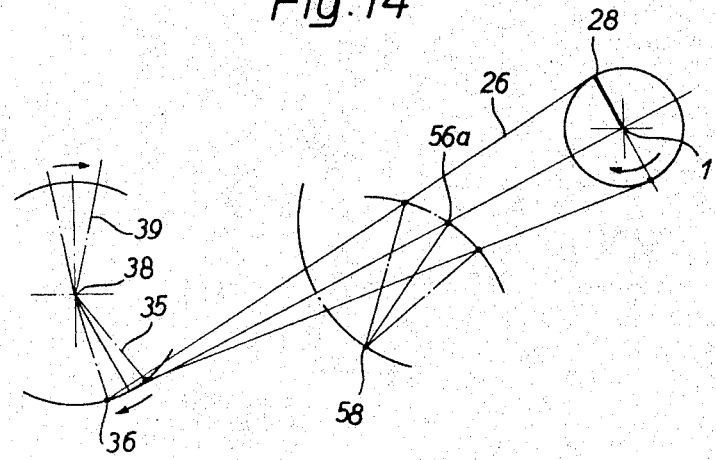
Figure 15:
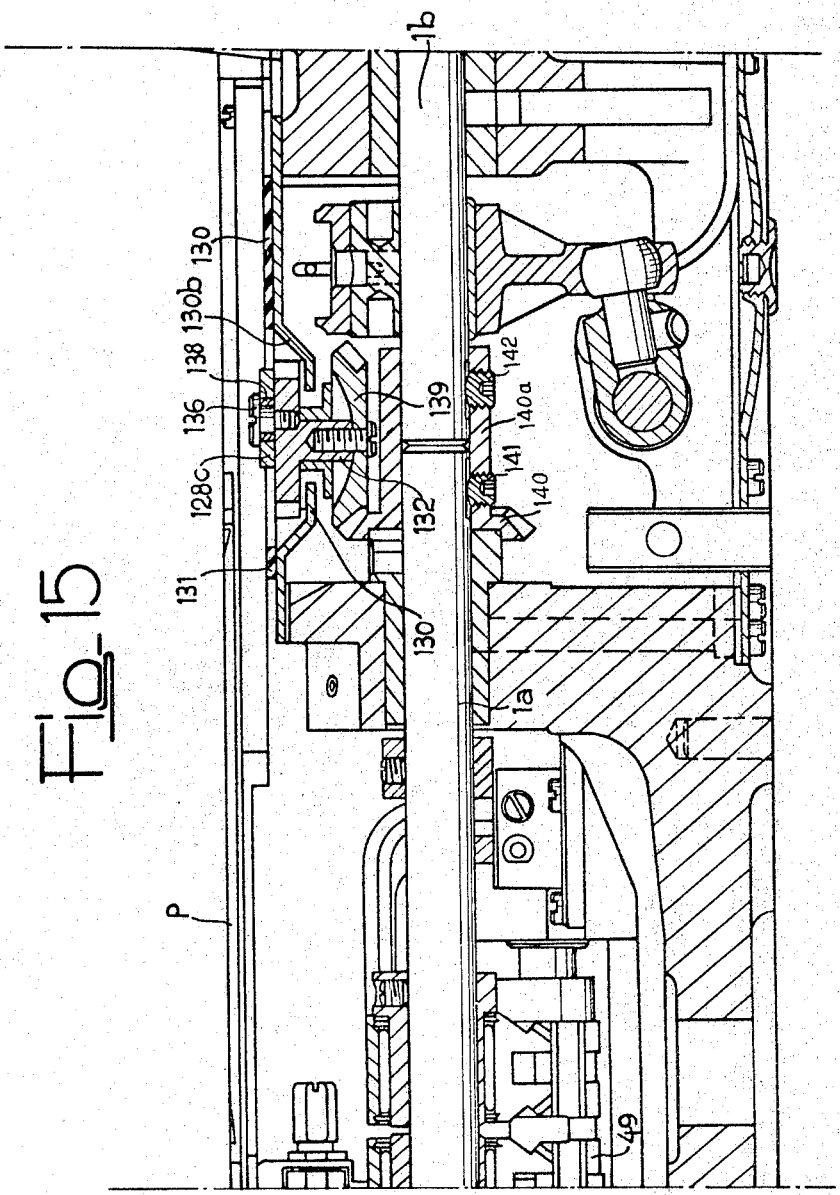

Movement of the arm 59 pushes the link 57 fulcrumed at 58 to the arm 59 and at 55a in the lever 26. Movement of the lever 26 effected by this operation is visible in FIGURES 13, 14, which diagrammatically show the position of these components during normal and reverse feed, respectively. With the above described mechanism in addition to reversing feed the stitches can be increased in density as well at the end of the row. Increase in density of stitches can be provided by the reversing device described above by employing a step having a vernier adjustment by which the lever effecting reversal can be stopped as near as possible to no feed in order to effect stitches of the shortest possible length.

Increase in density of the stitches insures against unravelling of the double chain stitches and fulfills a further important function.

When two fabric materials are sewn together in cloth manufacture and another fabric is interposed at a terminal or intermediate position in the row of stitches, such as a piece of elastic or a tape support in a stocking suspender, the row of stitches should be reinforced in view of the larger number and thickness of the fabrics to be sewn together. This necessitates an increase in the density of the stitches to give an increased strength of this reinforcement inserted in the work, by a sequence of stitches close to one another.

Operation of the hook 25 cooperating in forming the stitch on reversal of feed by means of interchangeable cams removably secured to the main drive shaft of the machine by means of screws is highly advantageous. Accurate adjustment for the setting of the path of the hook 25 is thus made possible, for highest efficiency in the intervention of the hook in forming the stitch.

According to the modification shown in FIGURES 15 to 18 the hook 125 is carried at the end of a flat bar 126. The other end of the bar is fitted into a recess 127 into an arm 128a of an oscillating bell crank lever 128, to which the rod 126 can be secured by means of screws 129 for adjustment in an axial direction.

The oscillating lever is supported in the manner described hereafter by a plate 130 reinforced by a cover plate 131 secured thereto, such as by welding, in which a cutout 131a is formed having semicircular ends. The plate 130 is formed at cutout 131a in the cover plate 131 with a portion 130a spaced from the latter merging into the remaining portion of the plate 130 by inclines 130b. The portion 130a of the plate 130 is formed with through holes having fitted therein bearings each supporting a pivot 132, 133 for gears 134, 135, respectively, being in mesh with each other. The gears 134, 135 each carry an eccentric pin in the form of the shank of a bolt 136, 137 reaching through the opening 131a in the cover plate 131 and screwed into its respective gear. The bolt 137 acts as a fulcrum for oscillation of the bell crank lever 128 carrying the rod 126 to which the hook 125 is fixed. The bolt 136 carries a slide 138 movable in an arcuate slot 128b in the arm 128c of the swing lever. With this construction, by properly dimensioning the components, the hook 125 can be caused to follow the desired path. By varying the mutual angular position of the gears 134, 135 said path can be varied. The plate 130 is formed in its periphery with a number of holes for screws, not shown, by means of which the plate 130 is secured to the bedplate supporting the shaft sections 1a, 1b of the main drive shaft of the machine. The holes are so arranged that attachment can be effected with the plate oriented to cause the plane containing the axes of the gears 134, 135 to be perpendicular to the axis of the shaft sections 1a, 1b of the main drive shaft. The downwardly extending portion of the pivot 132 carries a bevel gear 139 meshing upon assembly of the plate 130 on the machine with a bevel gear 140 mounted on the main drive shaft, the hub 140a of which interconnects, by means of screws 141, 142 the shaft sections 1a, 1b.

The hook propelling mechanism which makes formation of the stitch possible during reverse feed of the work, described above with reference to FIGURES 15 to 18, is considerably simpler than the previously described one, and is further advantageous in that it can be easily adjusted and removed from the machine for maintenance, checking and replacement.

It will be understood that details of the machine can be varied from the example described and illustrated without departing from the scope of this invention.

What I claim is:

1. In a double-chain stitch sewing machine, means for feeding the work being sewn, means for reversing the direction of feed of the work, means for forming chain stitches, said means for forming chain stitches including at least one needle, said means for forming chain stitches including means for forming the stitches when said feed means feeds the work in a reverse direction relative to the normal feed direction, a switch control device in the path normally followed by one hand of the operator attending to the machine for actuation by the operator's hand during his action accompanying and guiding the work as the work is being sewn, and actuating means interconnecting the control device and said means for reversing the feed of the work being sewn when the control device is operated by the operator's hand.

2. In a double stitch sewing machine according to claim 1, said control device being positioned adjacent the path followed by one needle of said chain stitch forming means.

3. In a double chain stitch sewing machine according to claim 2, said actuating means comprising a timed circuit and an electromagnet interconnecting said control device and said means for reversing the direction of feed of the work.

4. In a sewing machine according to claim 3, said circuit comprising an adjustable timer connected to said electromagnet, whereby said device reversing the direction of feed of the work is activated by the discharge current from the timer during a period of time determined by said timer.

5. In a sewing machine according to claim 4, said timer comprising a set of electric capacitors of different capacities and a movable contact positioned to interconnect said capacitors and said electromagnet, whereby the period of discharge of the capacitors determines the period of said reversal of the direction of feed.

6. In a double chain stitch sewing machine according to claim 1, a main shaft for driving said feeding means and said stitch forming means, said means for forming the stitches when said feed means feeds the work in the reverse direction comprising a bell crank lever having two arms, one of said arms being provided with an arcuate slot, a first pivot mounted for eccentric rotation about a first rotational axis and engaged by said arcuate slot, a hook carried by the other of said arms and arranged adjacent said stitch forming means, a second pivot mounted for eccentric rotation about another rotational axis and fulcrumed on said bell crank lever, said pivots being operatively connected to the main shaft for synchronous rotation thereby, said hook thereby being swung by said lever along a substantially elliptical path lying in a horizontal plane extending parallel to the plane in which lies the path followed by said work.

References Cited
UNITED STATES PATENTS

| | | | |
|---|---|---|---|
| 1,618,213 | 2/1927 | Moffatt | 112—200 |
| 2,849,974 | 9/1958 | Tishler et al. | 112—162 X |
| 3,009,428 | 11/1961 | Coolidge | 112—162 X |
| 3,150,622 | 9/1964 | Sigoda | 112—197 |

JORDAN FRANKLIN, *Primary Examiner.*

H. F. ROSS, *Assistant Examiner.*